(12) United States Patent
Conklin et al.

(10) Patent No.: US 9,679,132 B2
(45) Date of Patent: Jun. 13, 2017

(54) FILTERING ACCESS TO NETWORK CONTENT

(71) Applicant: HEWLETT-PACKARD ENTERPRISE DEVELOPMENT LP, Houston, TX (US)

(72) Inventors: Thomas Eaton Conklin, Leesburg, VA (US); Vinay Saxena, Richardson, TX (US); Patrick Charles McGeer, Orinda, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 699 days.

(21) Appl. No.: 13/625,575

(22) Filed: Sep. 24, 2012

(65) Prior Publication Data

US 2013/0276135 A1    Oct. 17, 2013

Related U.S. Application Data

(60) Provisional application No. 61/624,918, filed on Apr. 16, 2012.

(51) Int. Cl.
*G06F 3/00* (2006.01)
*G06F 21/55* (2013.01)
*H04L 29/06* (2006.01)

(52) U.S. Cl.
CPC ........ *G06F 21/554* (2013.01); *H04L 63/0227* (2013.01); *H04L 63/102* (2013.01); *G06F 2221/2149* (2013.01)

(58) Field of Classification Search
CPC ................. G06F 17/30; G06F 21/121; G06F 2221/2149; H04L 63/0227; H04L 45/021; H04L 45/16; H04L 45/22; H04L 63/0236; Y02B 60/31; H04N 21/4542; H04N 21/47
USPC ............ 726/1, 3, 6, 23, 24, 27, 13; 713/150, 713/168; 709/206, 217, 220, 225, 236; 370/392, 503
See application file for complete search history.

(56) References Cited

U.S. PATENT DOCUMENTS

| | | | |
|---|---|---|---|
| 6,421,709 B1* | 7/2002 | McCormick | G06Q 10/107 709/206 |
| 6,801,502 B1* | 10/2004 | Rexford | H04L 45/00 370/235 |
| 7,404,205 B2* | 7/2008 | Scoredos | H04L 63/0254 709/228 |
| 7,716,340 B2 | 5/2010 | Modrall | |
| 7,739,245 B1 | 6/2010 | Agarwal et al. | |
| 7,958,259 B2 | 6/2011 | Saika | |
| 7,987,493 B1* | 7/2011 | Reams, III | H04L 63/1458 726/1 |

(Continued)

OTHER PUBLICATIONS

Internet Filtering Solution: Contentwatch Internet Filtering End-to-End Technology, Content watch, pp. 1-17, download date: Sep. 24, 2012. <http://www.contentwatch.com/products/contentprotect/internet_filtering_solution>.

*Primary Examiner* — Joseph P Hirl
*Assistant Examiner* — Sayed Beheshti Shirazi
(74) *Attorney, Agent, or Firm* — Hewlett Packard Enterprise Patent Department

(57) ABSTRACT

A system receives a request to filter access by a client device to content over a network and causes access to network content by said client device to be filtered.

17 Claims, 13 Drawing Sheets

(56) References Cited

U.S. PATENT DOCUMENTS

| | | | | |
|---|---|---|---|---|
| 8,509,115 B2* | 8/2013 | Zeng | | H04L 12/18 370/254 |
| 8,891,380 B2* | 11/2014 | Khatri | | H04L 12/5695 370/242 |
| 2007/0014243 A1* | 1/2007 | Meyer | | H04L 69/24 370/249 |
| 2008/0019364 A1* | 1/2008 | Xia | | H04L 12/5692 370/392 |
| 2008/0196020 A1* | 8/2008 | Clinton | | G06F 8/65 717/172 |
| 2008/0320585 A1* | 12/2008 | Ansari | | H04L 63/1416 726/13 |
| 2009/0006618 A1* | 1/2009 | Hayton | | H04L 63/10 709/225 |
| 2009/0274089 A1* | 11/2009 | Money | | H04B 7/1858 370/316 |
| 2009/0328139 A1* | 12/2009 | Kitamura | | H04L 29/1232 726/2 |
| 2010/0111529 A1* | 5/2010 | Zeng | | H04L 12/2885 398/58 |
| 2010/0250775 A1* | 9/2010 | Nidumolu | | H04L 67/16 709/236 |
| 2011/0023119 A1* | 1/2011 | Rayes | | H04L 63/145 726/23 |
| 2011/0047388 A1* | 2/2011 | Park | | G06F 21/6209 713/189 |
| 2011/0072508 A1* | 3/2011 | Agarwal | | H04L 63/0227 726/13 |
| 2011/0208958 A1* | 8/2011 | Stuedi | | G06F 17/30017 713/150 |
| 2011/0211596 A1* | 9/2011 | Khatri | | H04L 12/5695 370/503 |
| 2011/0238780 A1* | 9/2011 | Neitzel | | G06F 17/30893 709/217 |
| 2011/0268119 A1* | 11/2011 | Pong | | H04L 47/32 370/392 |
| 2011/0307574 A1* | 12/2011 | Lipman | | H04W 8/186 709/217 |
| 2011/0314527 A1* | 12/2011 | Kim | | H04L 63/1458 726/6 |
| 2012/0023552 A1* | 1/2012 | Brown | | H04L 63/14 726/3 |
| 2012/0079524 A1* | 3/2012 | Kalidindi | | H04N 21/2225 725/28 |
| 2012/0106354 A1* | 5/2012 | Pleshek | | H04L 43/12 370/241 |
| 2012/0117649 A1* | 5/2012 | Holloway | | G06Q 30/0241 726/24 |
| 2013/0054761 A1* | 2/2013 | Kempf | | H04L 12/4633 709/220 |
| 2013/0133060 A1* | 5/2013 | Hashiguchi | | H04L 63/0236 726/13 |
| 2013/0227284 A1* | 8/2013 | Pfeffer | | H04L 63/0236 713/168 |

* cited by examiner

FILTERING ACCESS TO NETWORK CONTENT

CLAIM FOR PRIORITY

The present application claims priority to U.S. Provisional application No. 61/624,918, filed on Apr. 16, 2012, the disclosure of which is incorporated by reference herein in its entirety.

BACKGROUND

As the internet grows, controlling access to undesirable websites and content is a pressing issue. For example parents may wish to prevent their children from accessing websites with graphic depictions of crime, violence, pornography or other adult content. Likewise, many companies may wish to limit access of their employees to content which they deem undesirable during work hours, including not only the above, but also, for example, social networking sites and sports sites which may be perceived to be unproductive use of employee time. This issue applies not only to websites, but also to other forms of content available over the Internet such as download services, file sharing, mobile apps etc.

Typically, access to content is filtered by an application installed on each client device (laptop, desktop computer, mobile, tablet etc). Another approach is to carry out the filtering at the customer side gateway (e.g. the gateway connecting the local area network to the Internet). With both these approaches, a user attempting to access undesirable content will be denied access by the content filter. However, these methods lack flexibility and may have difficulty keeping up with the proliferation of mobile and wireless devices.

BRIEF DESCRIPTION OF THE DRAWINGS

Examples of the present disclosure will now be described, by way of non-limiting example only, with reference to the accompanying drawings, in which.

DETAILED DESCRIPTION

The present disclosure describes a system for filtering access by a client device to content over a network. Filtering means that the client device may be denied access to certain types of content on the network. For example, content relating to certain undesirable subject matter, or residing on certain URLs may be denied. The system may enable a user to request that access to the network by a certain specified network device is filtered. Thus, for instance, the system may filter access to the network by one or more client devices for which it has been requested to filter access, and allow access by other client devices to pass unfiltered.

Figure 1:
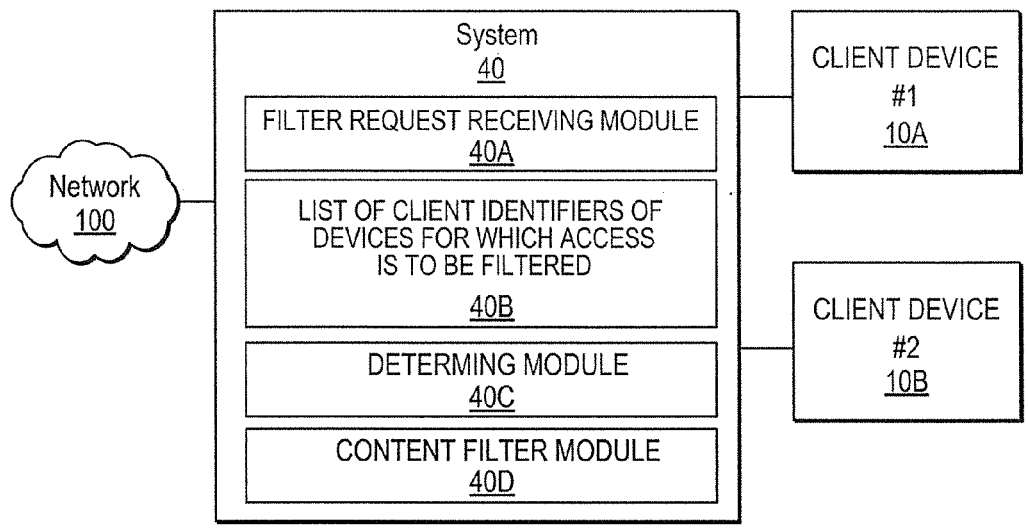
FIG. 1 shows an example system for filtering access by a client device to a network.

FIG. 1 shows one general example of such a system 40. Client devices 10A, 10B connect to the system 40 directly, or indirectly, via a wired or wireless connection. The client devices may be any computing devices capable of requesting and receiving network content, for example a laptop or desktop computer, mobile device, smart phone, tablet etc.

The system 40 is connected to a network 100 and provides access to network content (e.g. content from the Internet, an external network or other network resources such as a cache of network content held in the system 40 or elsewhere). In use the system 40 facilitates access of the client devices to the network content and may filter the access in accordance with content filtering rules. The system may be implemented on a single device or distributed over several devices, such as a switch, router, controller or server etc. The system comprises a plurality of modules 40A to 40D which are described in more detail below. The modules may be located on one device or distributed over several physical devices and may be implemented as hardware, software or a combination thereof and may be executed by a processor. For example the modules may comprise data stored in a non-transitory storage medium, a hardware logic module such as an ASIC or FPGA and/or machine readable instructions stored in a storage medium and executable by a processor.

As shown in FIG. 1, the system 40 has a filter request receiving module 40A which is operable to receive requests from a user to filter or 'un-filter' access by a client device to network content. The system stores a list 40B of client identifiers of client devices for which access to network content is to be filtered (i.e. those client devices for which a request to filter access to network content has been received), a determining module 40C for determining whether a traffic flow is associated with (e.g. originated from or destined for) a client device for which access is to be filtered, and a content filter module 40D.

Figure 2:
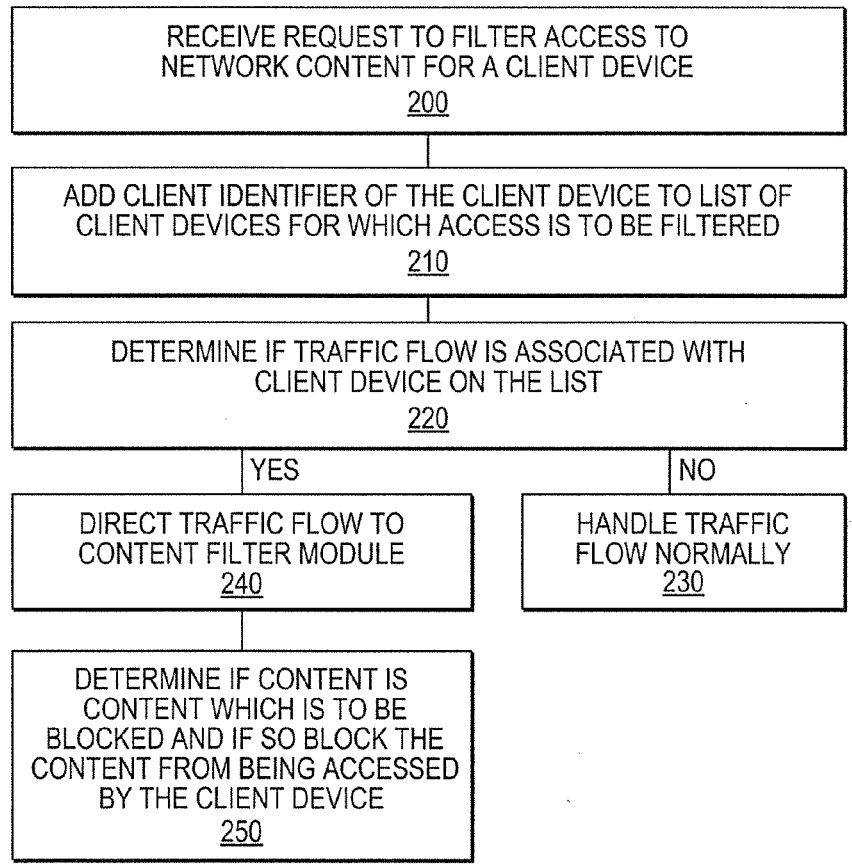
FIG. 2 is a flow diagram showing an example method of filtering access by a client device to a network.

A method of filtering access to network by the client device is shown in FIG. 2. At block 200 the request receiving module 40A receives a request to filter access to network content by the client device. At block 210 the request receiving module adds a client identifier of the client device to a list 40B of client devices for which access to network content is to be filtered. At block 220 the determining module 40C receives a traffic flow (e.g. one or more packets) and determines whether the traffic flow is associated with (e.g. received from or destined for) a client device on the list 40B. If not, then the traffic flow is handled normally at block 230. However, if the traffic flow is associated with a client device for which content filtering has been requested, then at block 240 the traffic flow is directed to the content filter module 40D. At block 250 the content filter module 40D filters the traffic flow accordingly. E.g. the content filter module may determine whether the traffic flow relates to content which is to be blocked for the client device and if so then blocks the content from being accessed by the client device.

By providing a mechanism for a user to request filtering of content for a particular client device, it is possible for access to content to be filtered for some client devices and not others. For example, in a household, parents may submit a request to a service provider (e.g. ISP or carrier) to filter access for client devices belonging to their children while allowing unfiltered access for their own client devices (the ones used by adults). Thus it is possible for the user to determine the filtering levels for each device (e.g. by logging into a secure portal provided by the service provider through which filtering settings may be changed). The user may specify one client device or a plurality of client devices for which access to network content is to be filtered, or a particular category of client devices (e.g. all tablet computers or all mobile devices or all devices from a particular manufacturer).

With this system, it is not necessary to install filtering software on each client device (such installation is time consuming and may be circumnavigated by technically knowledgeable users). Furthermore, with the system described above the filtering may be effective even if the client device tries to access the content from a new location (e.g. a friend or neighbor's house), as long as the access is still via the same service provider.

Figure 3:
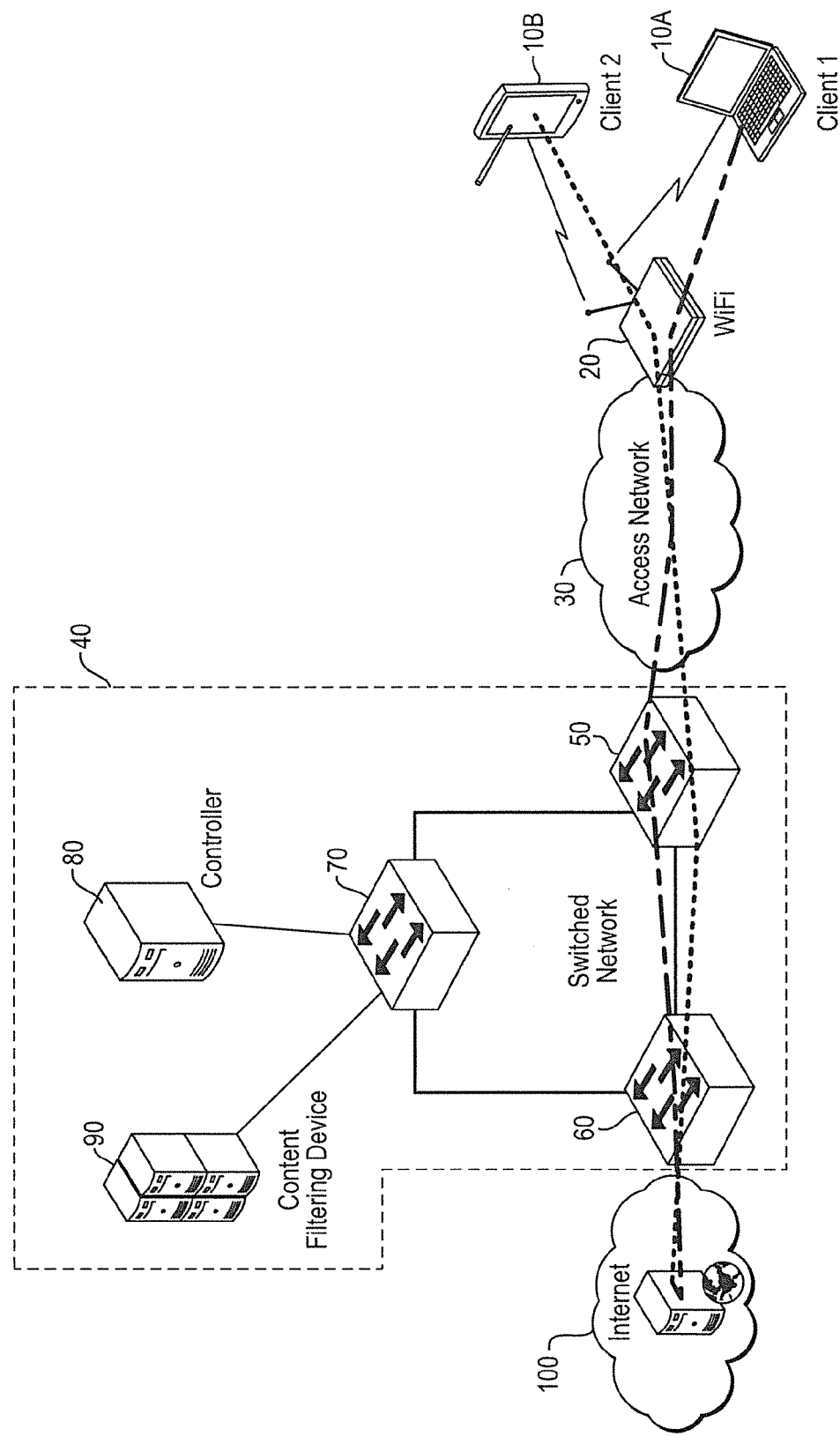
FIG. 3 shows an example of a system for filtering access by a client device to a network and a traffic flow in which content is not filtered.

FIG. 3 shows a more detailed example, of a system 40 for filtering access by a client device to network content. The system is distributed over a plurality of devices and traffic is directed along different paths depending upon whether it is to be filtered. The system 40 is provided by the service provider. The service provider may for example be an Internet Service Provider (ISP) or a Carrier (e.g. mobile phone company providing a telecommunications network).

Client devices 10A and 10B are connected to an access device 20 which connects the client devices to a service provider 40 via access network 30. The access device 20 may for example be a wireless access point, wired switch, or a gateway such as a router etc. The access network 30 may comprise a gateway to connect with the access device 20 and any suitable communications link, such as DSL, ADSL, ISDN, SDH, SONET etc to the service provider 40. In an alternative arrangement the client devices 10A, 10B may connect directly to the service provider through a wireless cellular network e.g. GSM, CDMA, UTMS, LTE, WiMax etc rather than through an access device.

The service provider enables client devices to access to a network and "network content". The 'network content" may for example be content available on the Internet, content available on another external network, or content stored by the service provider (e.g. a cache of Internet content stored locally by the service provider so that recently or frequently downloaded content may be accessed quickly).

In the illustrated example the service provider network 40 comprises a set of network devices 50, 60, 70 for routing traffic, at least one controller 80 and a content filter device 90. The network devices may be any suitable devices capable of routing traffic and may for example be switches or routers etc.

The first network device 50 connects to the access network to receive traffic from and forward traffic to the client devices. The second network device 60 connects to external networks such as the Internet and any cached content stored by the service provider. The third network device connects to both the first and second network devices and to a controller 80 and a content filter 90.

While the content filter device 90 and controller 80 are shown as separate devices in FIG. 3, they may be implemented in the same physical device. In still other variations, the content filter may be provided on an external network separate from the service provider. It should be noted that while three network devices are shown in FIG. 3, that is an example only and more or less network devices may be provided depending on the topology and size of the service provider network.

FIG. 3 shows traffic flows by which the client devices access the Internet via the service provider. The traffic flow associated with the first client device 10A is shown by a dashed line, while the traffic flow associated with the second client device 10B is shown by a dotted line. As can be seen, traffic from both the first and second client devices travels along a first path, which does not pass the content filter device 90. Thus in the illustrated example the first path is directly from the first network device 50 to the second network device 60 to the Internet (or another external network or cache). Both requests for content and downloaded content flow along this first path, on which content is not filtered.

Figure 5:
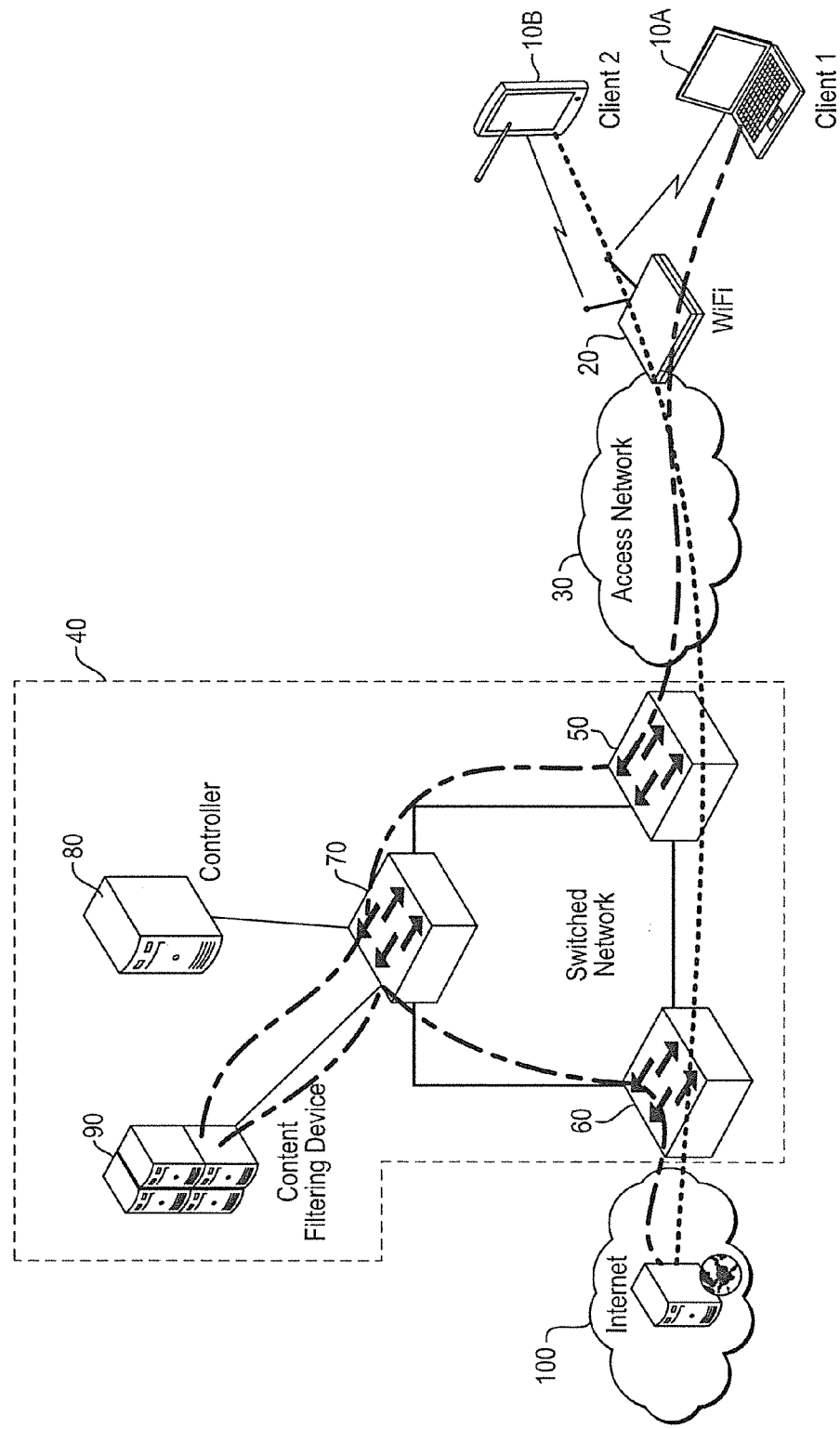
FIG. 5 shows the system of FIG. 3 with a traffic flow in which content is filtered for a first client device.

FIG. 5 shows a different path for traffic associated with the first client device 10A, after a user has requested that access to the network by said first client device 10A is filtered. Traffic on the second path flows from the first client device 10A to the first network device 50 to the third network device 70 to the content filter device 90, back to the third network device 70 and from there to the second network device 60. The second network device 60 directs the traffic received from the third network device 70 to the source of the requested network content 100 (e.g. the Internet, another external network or a cache hosting the requested content).

Referring to FIG. 5, requests for content from the first client device 10A flow in the direction from the first network device 50 to the second network device 60 along the second path on which content is filtered (i.e., via the content filter device 90). Likewise replies to such requests, and downloaded data, flow from the content source 100 to the second network device 60 to the first network device 50 along the second path via the content filter device 90.

The content filter device 90 examines requests for content and data which is destined for the client device and determines whether it relates to content which is to be blocked. The content filter device may block undesirable content by blocking the request from leaving the service provider and/or blocking download of data from the service provider to the client device. The content filter device may use any suitable method for detecting undesirable content. For example the content filter device may block requests for access to and/or content received from a list of blocked URLs, or only permit requests for and data from a "whitelist" of allowed URLs, or may examine the nature of the content based on verbal, contextual or other analysis and determine whether or not it should be allowed. In the case that the content is blocked the system may send the client device a message stating that the requested content is blocked or direct the client device to a URL or website displaying a message stating the requested content is blocked.

Meanwhile, traffic associated with the second client device 10B (shown by the dashed and dotted line) continues to travel along the first path and is not filtered by the content filter device 90, as the user has not requested filtering of access by the second client device. Thus even if the first and second client devices send packets with the same destination address (e.g. requesting a particular website), the packets are directed along different paths based on the source of the packet and based on the fact that the user requested filtering of access to network content for the first client device, but not the second client device. Likewise for packets of network content destined for the client devices, the path used is not necessarily the most direct one and is varied depending on whether or not the packet is destined for a client device for which filtered access has been requested.

The above describes one example of a system in which traffic associated with a device, for which content is not to be filtered, is directed along a first path and traffic associated with a client device, for which content is to be filtered, is directed along a second path. It will be understood that in larger or more complicated service provider networks there may be more intermediate hops and/or more than two possible paths; however the principle is the same: some paths will pass a content filter device, while other paths will not pass through the content filter device. Thus, in this application the term a 'first path' and a 'second path' should be understood to cover both the situation where there are just two paths and also the situation where there is a first set of paths (on which content is not filtered) and a second set of paths (on which content is filtered).

This method of different forwarding paths depending on whether a packet is associated with a client device for which a user has requesting filtering, may be implemented by having the controller 80 update the forwarding tables and/or policies of the network devices on demand. For instance a controller and network devices operating according to a Software Defined Networking (SDN) protocol, such as Open Flow, may be used. Further, the forwarding may be carried out at either layer 2 or layer 3 of the OSI model. The method is described in more detail with reference to FIG. 4.

Figure 4:
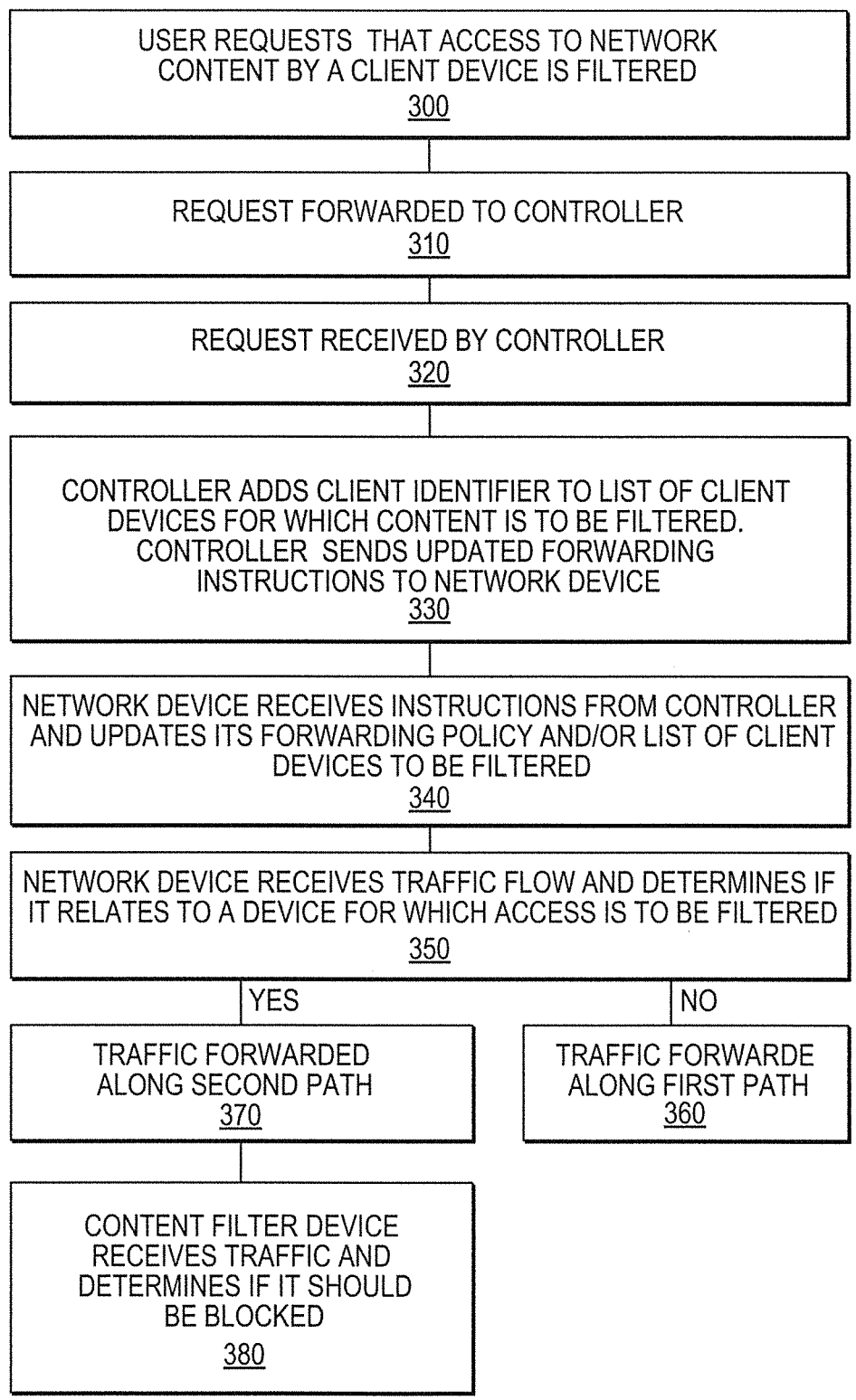
FIG. 4 shows a flow diagram of a method of requesting that access by a client device is filtered and causing subsequent access by the client device to be filtered.

Referring to FIG. 4, at block 300 a user requests that access to network content by a network device is filtered. The user may specify a particular network device, a plurality of network devices for which access is to be filtered (and in some cases the user may even specify a category of network devices, such as all mobile devices, or devices from a particular manufacturer if allowed to do so by the service provider).

The user may make this request from the client device which is to be filtered or from another client device, for instance through a web portal provided by the service provider for this purpose. The user may have to log into the service and provide security credentials, such as a user name and password, in order to prevent the settings being changed by anyone.

At block 310 the request is forwarded to the controller 80 and at block 320 the request is received by the controller 80. For example, the request may be forwarded directly from the web portal or server on which the user made the request or forwarded via an intermediate device. In some cases the request may be made directly to the controller in which case no forwarding is needed (e.g. if the controller is a server with a module for providing a user interface or web portal for receiving the request).

The controller obtains a client identifier of the client device for which filtered access is requested. For example the client identifier may be a MAC address, or IP address of the client device. In some cases other information may be used as the client identifier, especially if due to NAT (Network Address Translation) the MAC or IP address of the client device is obscured by a customer side gateway. For example the client identifier may be information relating to a layer 2 tunnel with which the client device communicates with the service provider, or other information from which a traffic flow associated with the client device can be identified. The client identifier may be obtained directly, or derived, from the information provided by the user when making the request to filter access, by examining network information indicating where the request to filter access came from, by requesting further information from the user or otherwise.

At block 330 the controller adds the client identifier to a list of client devices for which content is to be filtered. This list may be stored in a storage medium of the controller. The controller sends routing instructions to the relevant network devices (50, 60 and 70 in FIG. 3) instructing them to update their forwarding tables and algorithms accordingly so that traffic associated with the client device for which filtered access is requested, is directed along a path on which content is filtered (e.g. the second path in FIG. 3 including the content filter device 90).

At block 340 each network device receives the instructions and updates its data pane accordingly. In particular the network device may update or create a list of client devices for which access is to be filtered. The controller may also instruct the network device to set up a forwarding algorithm to direct packets related to a client device on said list according to a second path and direct packets related to other client devices along a first path (if the network device does not already have such an algorithm). For example for the first network device 50 of FIG. 3, the algorithm may be to forward traffic from a client device on the list to the third network device 70 and traffic received from other client devices to the second network device 60.

At a later time, shown by block 350, a network device receives a traffic flow associated with a client device and checks if the client device with which the traffic flow is associated is on the list of client devices for which network access is to be filtered. The network device may use any appropriate traffic flow or packet analysis techniques (such as Open Flow) to determine if the traffic flow is associated with a client identifier on said list. A 'traffic flow' is one or more packets associated with the same request for network content (e.g. relating to download of a particular file, or particular webpage).

At block 360 if the network device determines that the traffic flow is not associated with a client device on the list then it is forwarded along the first path.

At block 370 if the network device determines that the traffic flow is associated with a client device on the list then it is forwarded along the second path.

At block 380 the content filter device receives and examines traffic forwarded on the second path. It determines if the content is content for which access by the client device is to be blocked and if so it blocks access to the content accordingly.

Figure 6:
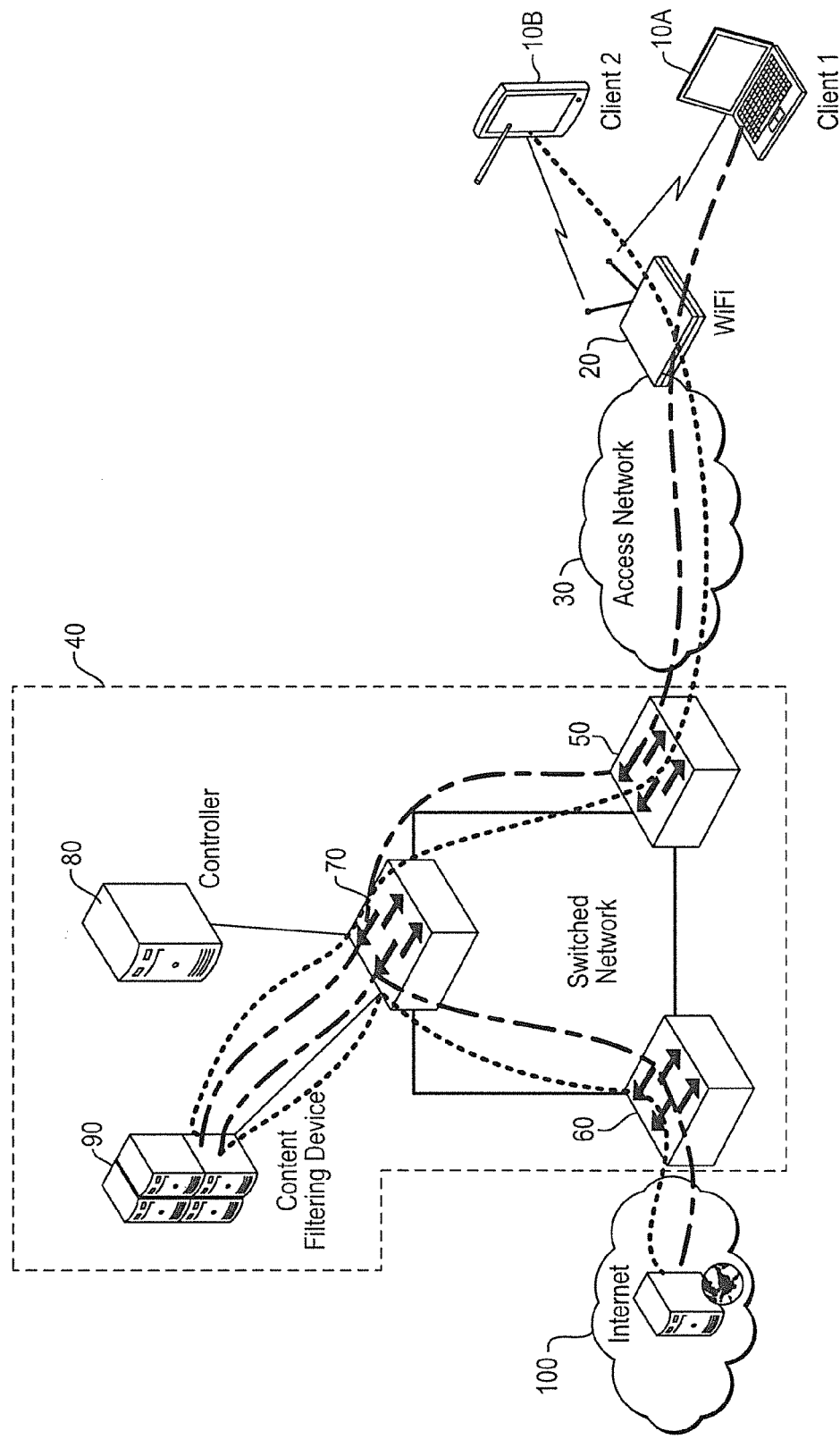
FIG. 6 shows the system of FIG. 3 with a traffic flow in which content is filtered for first and second client devices.

FIG. 6 shows the traffic flow after the user requests that access to network by the second device is also filtered. It can be seen that the path taken by traffic associated with both the first and second client devices is now the same and passes via the content filter device.

Figure 7:
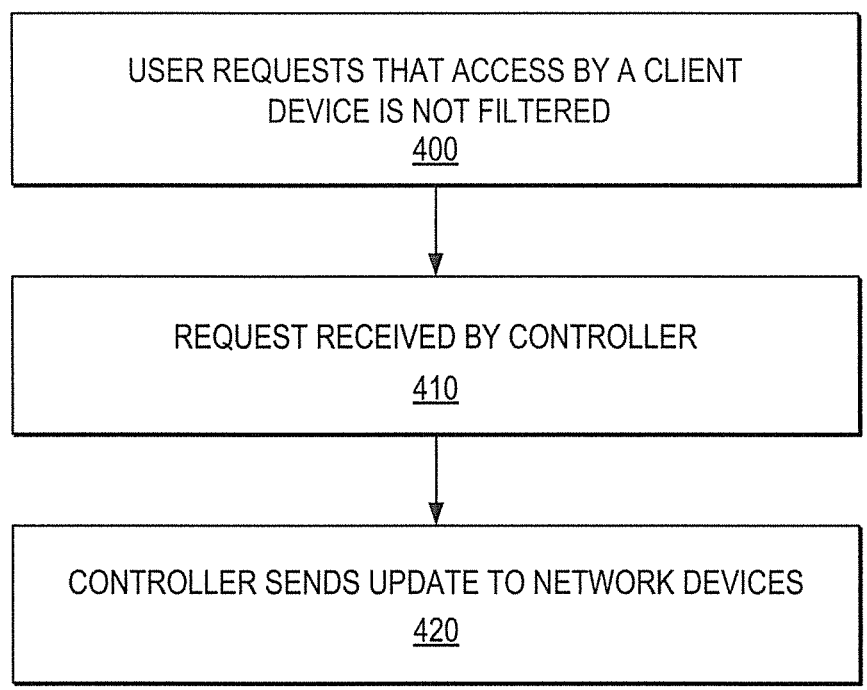
FIG. 7 shows a flow diagram for a method of requesting that access by a client device is not filtered and causing subsequent access by that client device not to be filtered.

It is possible for a user to request that a client device be removed from the filtering list. FIG. 7 is a flow diagram showing an example method of removing a client device from the list. At block 400 the user requests that access to network content by a particular client device is not filtered. For instance the user may log into an account on a web portal and change the settings for that client device. At block 410 the request is received by the controller 80. At block 420 the controller sends an update to the network devices instructing them to remove the specified client device from the list of client devices for which access is to be filtered and to forward traffic associated with that client device normally, e.g. along the first path on which content is not filtered.

Figure 8:
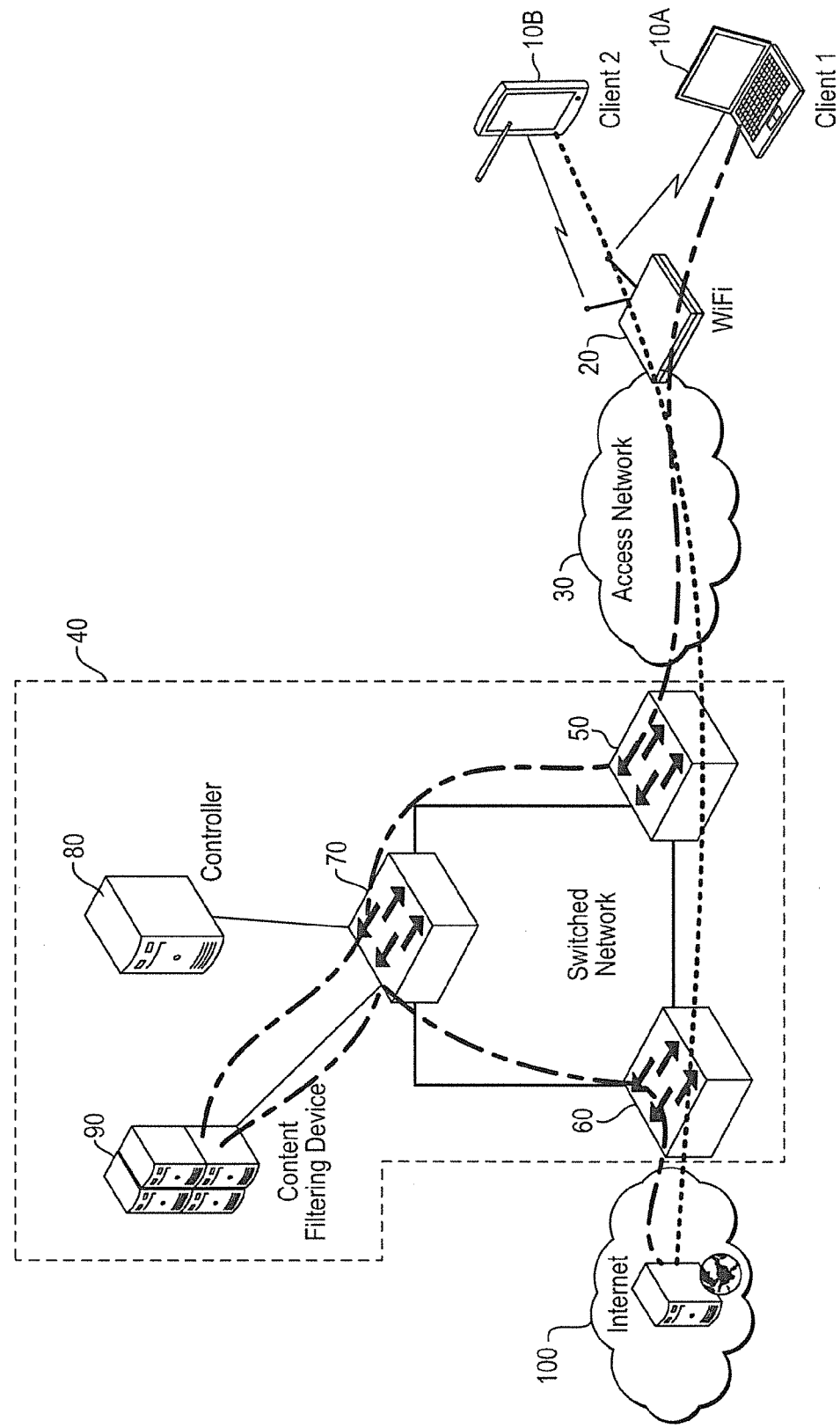
FIG. 8 shows the system of FIG. 6 after traffic flow for the first client device has been changed in response to a request not to filter content for the first client device.

FIG. 8 shows the situation after the second client device has been removed from the list of devices for which network access is to be filtered. It can be seen that traffic associated with the second device is now re-directed along the first path again. The ability to (temporarily or permanently) remove a device from the list of devices for which access to network content is to be filtered may be useful in many situations. For example, perhaps a parent wishes to use the second client device to access some blocked content for a particular research project (and after the project has been completed, filtering can be switched back on again).

One consideration is that some types of traffic may require more filtering than others. As the network devices may be able to recognize different types of traffic they may be instructed by the controller to only direct certain types of traffic along the second path. E.g. traffic relating to file sharing, FTP and web browsers may be directed along the second path (if it is associated with a client device for which access to content is to be filtered), while traffic relating to an email client may be directed along the first path (even if it is associated with a client device for which access to content is to be filtered).

In some cases, if there is a large amount of data, traffic redirection along a different path and content filtering may reduce data throughput or require extra provision of bandwidth or processing or content filtering resources. Certain types of traffic flow contain more data and may last longer than others (for example large files, video content etc are much larger and generate more longer flows of traffic, compared to short emails, or simple webpages. A "long-lived flow" is any data flow lasting more than a specified period of time or containing more than specified amount of data—whether an absolute amount or an amount relative to the service provider network capacity. The exact threshold can vary and may be set by the controller 80 and propagated to the network device and/or set by a system administrator in accordance with the needs of the service provider, e.g. the configuration of the service provider network and the capability of the content filter and network devices.

The network devices are often capable of detecting a particular type of flow and forwarding it accordingly (i.e. the network device is able to determine whether a particular packet belongs to an existing flow or is part of a new flow). Therefore the controller 80 may instruct the network devices to detect long lived flows on the second path and direct them along the first path. This may be conditional on the long lived having been initially approved by the content filter device; although typically a flow is only be able to become long-lived if has been approved by the content filter (otherwise it is blocked before it can become long-lived, but further checks may be implemented if necessary).

Figure 9A:
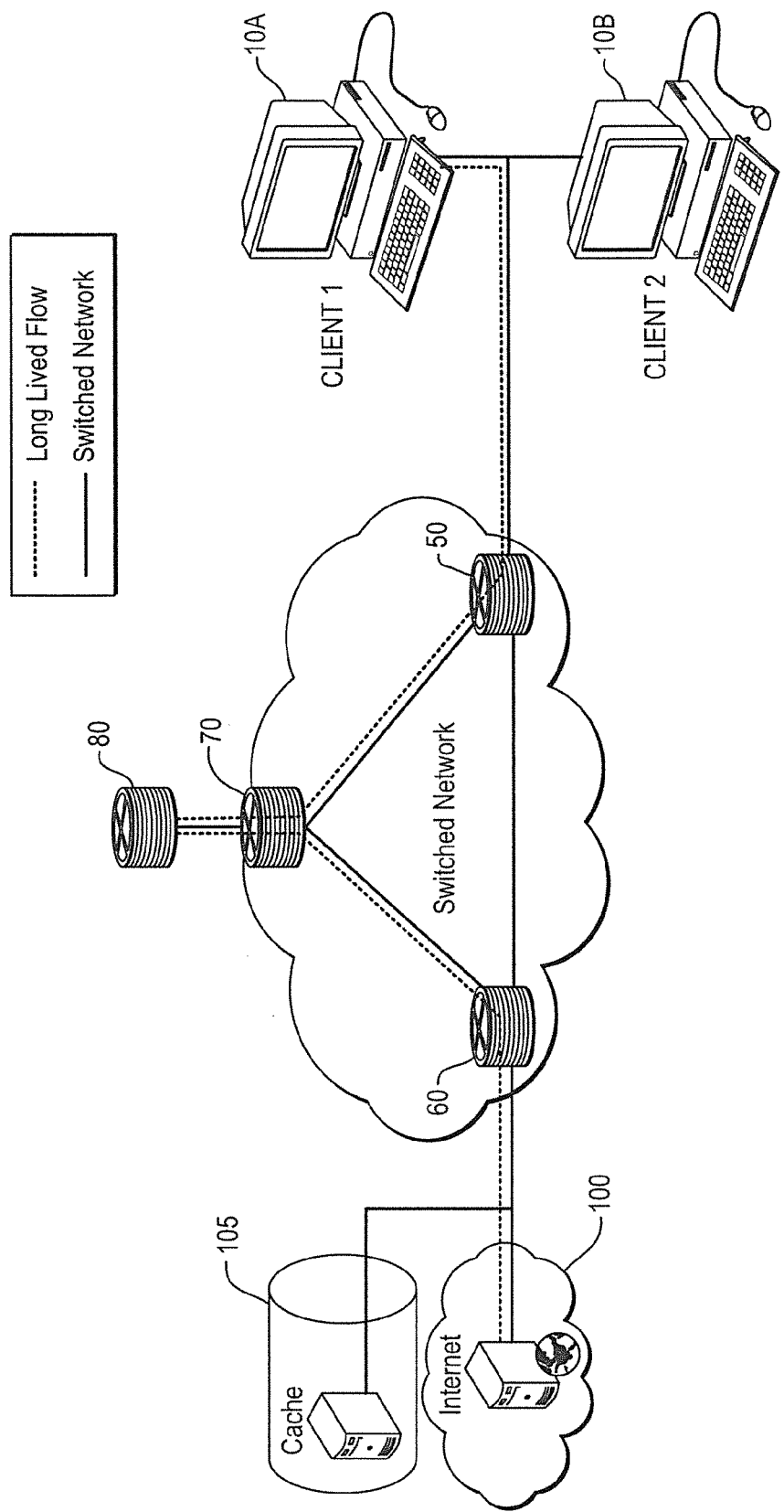
FIG. 9A shows a system for filtering access to network content by a client device, before a long-lived flow is detected.
Figure 9B:
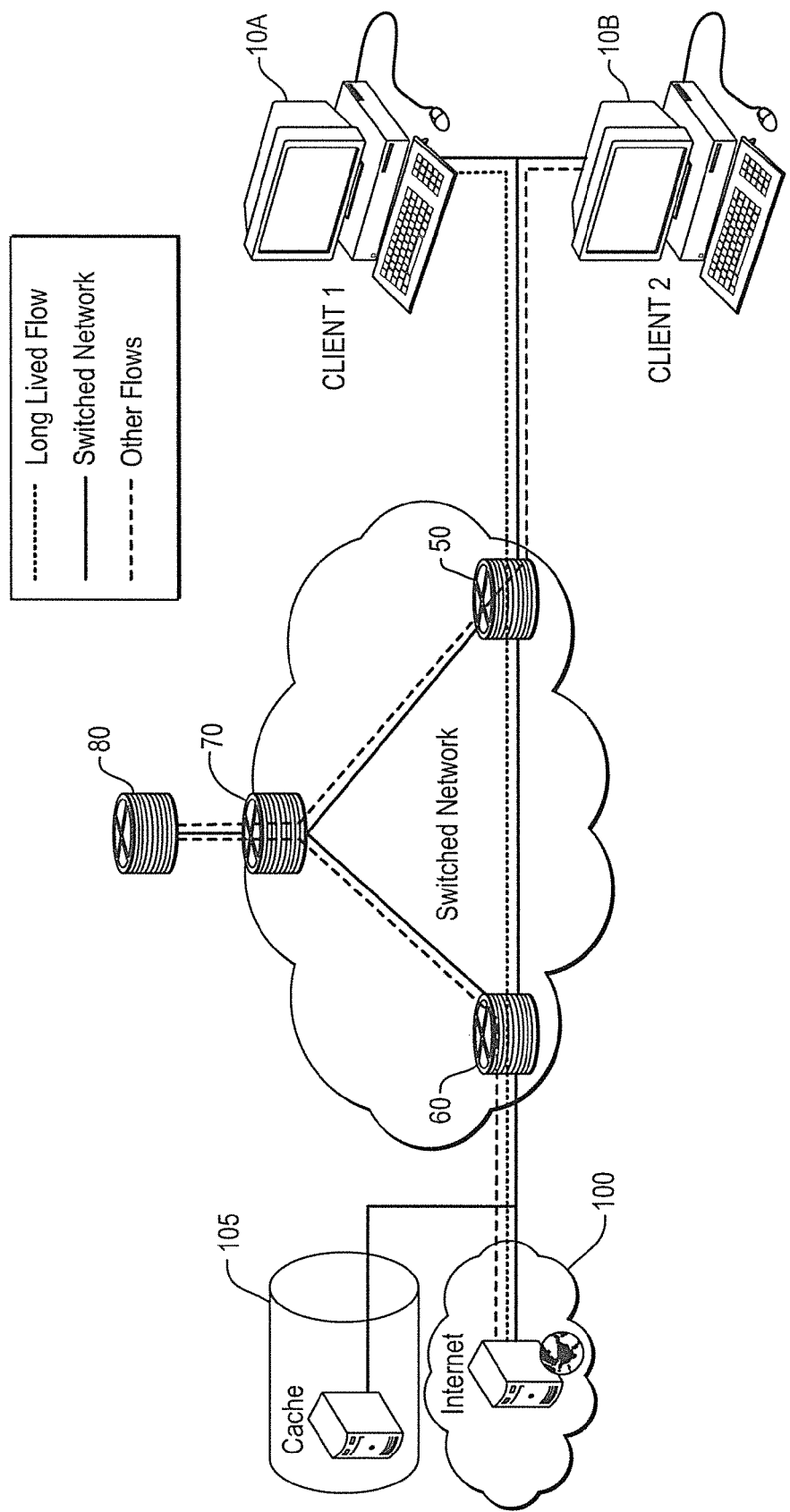
FIG. 9B shows the system of FIG. 9A after a long-lived flow is detected and re-directed.

FIGS. 9A and 9B show a system which is essentially the same as that of FIG. 3 and like parts are denoted by the same reference numerals as in FIG. 3. In FIG. 9A traffic associated with the first client device 10A is directed along the second path via the content filter device 80 (in FIG. 9A the content filter is part of the controller 80). In FIG. 9B the third network device detects that the traffic associated with the first client device 10A is a long-lived flow (that has already been approved by the content filter) and re-directs it along the first path. In this way the flow may be processed more quickly (as the path is more direct) and pressure on the third network device and the content filter device may be relieved. Meanwhile traffic associated with the second client device 10B is not a long-lived flow and therefore is directed along the second path (in this example it is assumed that filtering is requested for both the first and second client devices).

Figure 10A:
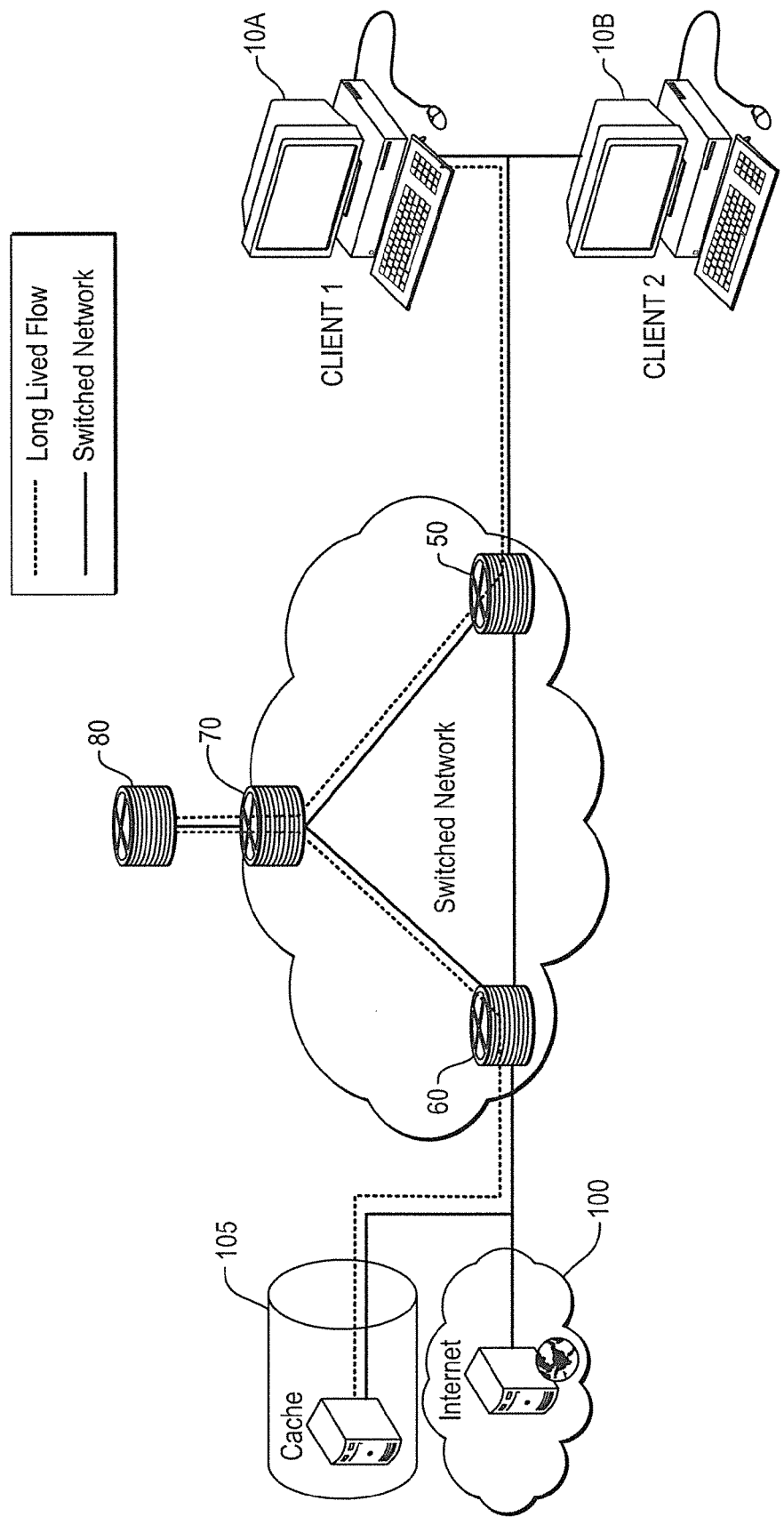
FIG. 10A shows a system for filtering access to a network content on a cache by a client device, before a long-lived flow is detected.
Figure 10B:
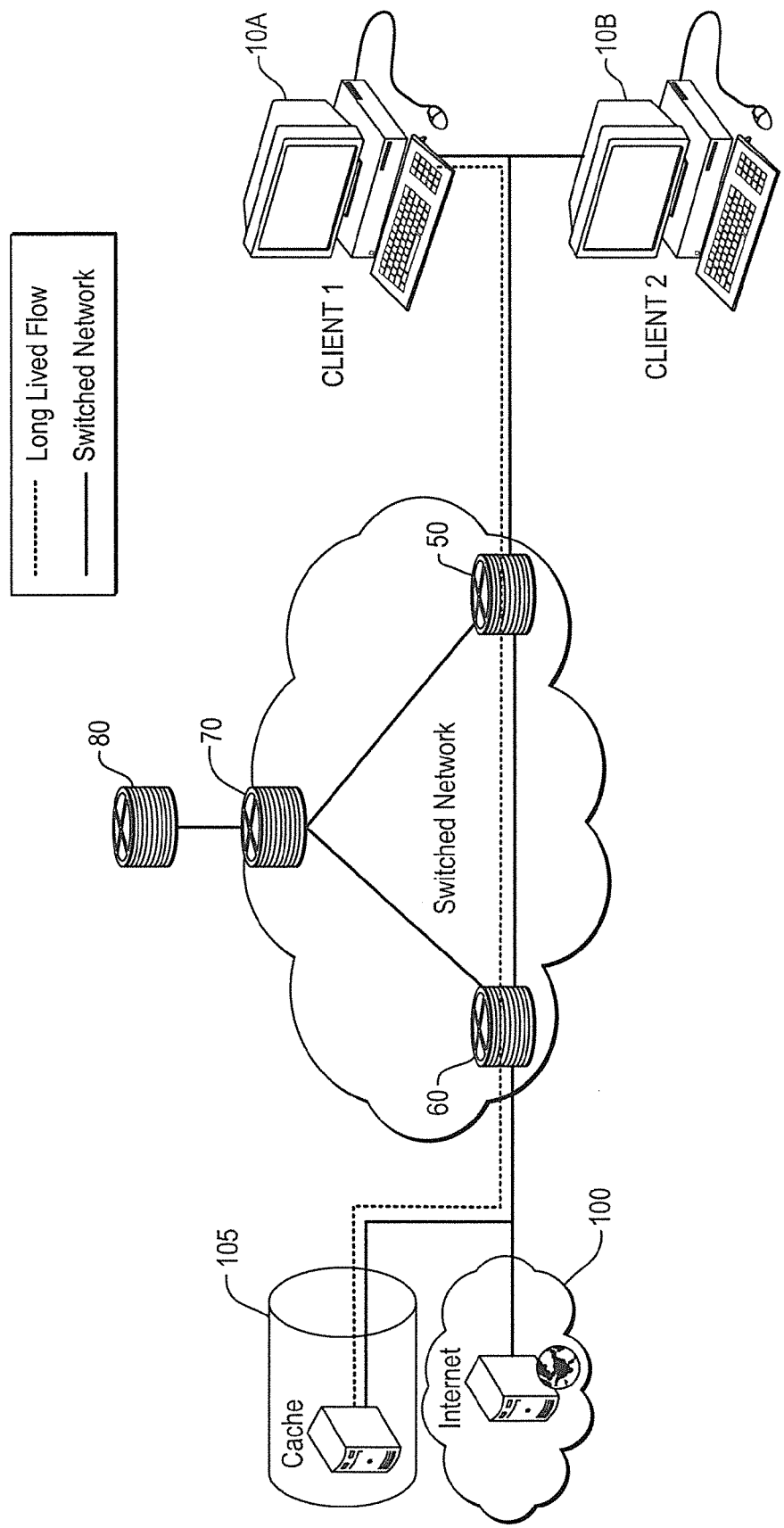
FIG. 10B shows the system of FIG. 10A after a long-lived flow is detected and re-directed.

FIGS. 10A and 10B are the same as FIGS. 9A and 9B respectively, but network content is sourced from a cache 105 instead of the Internet 100. For example the cache may be hosted by the service provider 40. If the client device requests content which is available in the cache 105 then the service provider retrieves the content from the cache 105 rather than forwarding the request over the Internet. For example, content which is frequently accessed, or has recently been accessed by the client device or another client device serviced by the service provider, may be stored in the cache for a period of time. As some content stored in the cache 105 may be undesirable to certain users, if content requested by a client device for which access to the network is to be filtered is available on the cache, it is still directed via the second path and the content filter device 90 as shown in FIG. 10A. However, if the content is approved by the content filter device 90, then if the third network device 70 recognizes the traffic as a long-lived flow, then it may be re-directed along the first path as in FIG. 10B.

Figure 11:
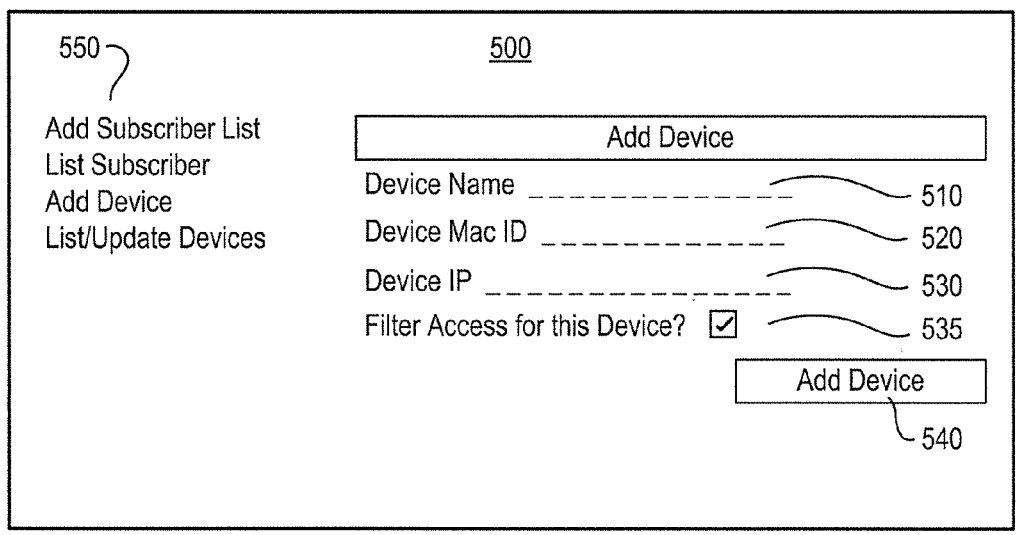
FIG. 11 shows an example of a web portal through which a user can submit a request for access to network content by a client device to be filtered.

FIG. 11 shows an example of a web portal user interface for requesting that access to network content by a client device is filtered. After successfully logging in, including providing security credentials if requested, the user is presented with a screen 500 for adding client devices to a list of devices for which filtering is requested. The user may enter a client device name in field 510 for personal reference, the client device's MAC address in field 520, the client device's IP address in field 530 and/or another parameter such as the layer 2 tunnel used by the client device, indicate at tick box 535 whether access to network content by that device is to be filtered, and then click button 540 in order to register the client device as one for which access to network content is to be filtered. The user may also click a link 550 to view a list of client devices associated with that user (e.g. subscriber to the service provider).

Figure 12:
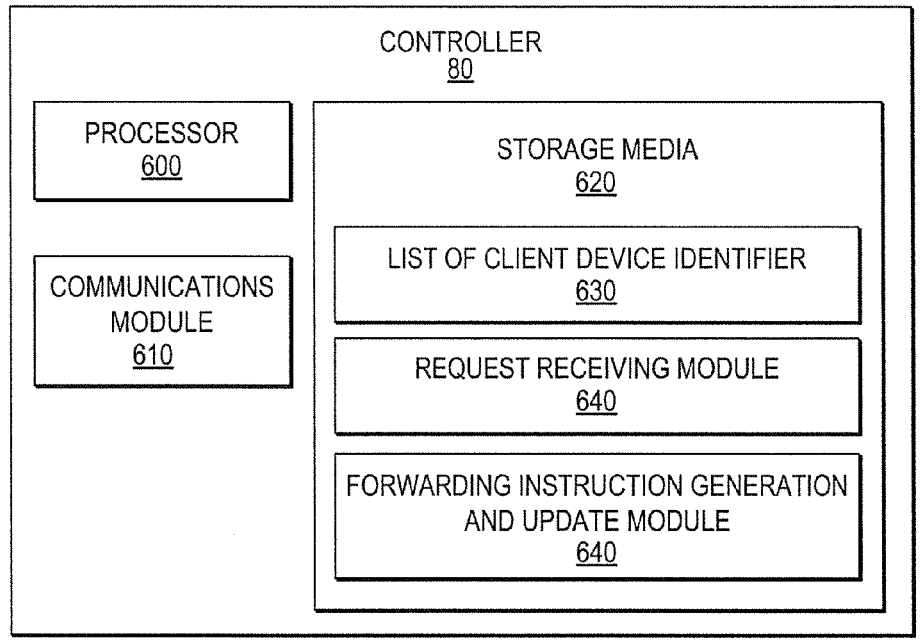
FIG. 12 shows an example structure of a controller for controlling filtering of access to network content by a client device.

FIG. 12 shows an example structure of a controller such as may be used in the system of FIGS. 3 to 10. The controller 80 may be a SDN (e.g. Open Flow) controller which is capable of communication with one or more network devices (e.g. switches, routers etc) and operable to provide control plane functionality for the network devices (e.g. by updating the network devices' forwarding tables and/or forwarding algorithms on demand).

The controller has a processor 600, a communications module 610 and a non-transitory storage media 620. The processor, communications module and storage media may be communicatively linked by a bus or other connection. The communications storage medium 610 may comprise one or more ports (e.g. Ethernet ports) and logic for receiving and transmitting messages through these ports. The storage media may be one or several storage devices and may instance comprise SDRAM, Flash memory, a hard drive etc. The storage media stores a request receiving module 630 of machine readable instructions for receiving a request from a user to filter access by a client device to network content, a list 640 of client device identifiers of client devices for which access to network content is to be filtered and a routing instruction generation and update module 650 for generating forwarding policies and updating forwarding policies, communicating with network devices (switches, routers etc) and sending the network devices instructions to implement or update their forwarding tables, forwarding policies and/or local lists of client device for which network access is to be filtered.

The processor 600 is operable to execute machine readable instructions stored on the storage media, including modules 630 and 650. In other implementations the modules 630 and 640 may be implemented in hardware as dedicated logic such as a FPGA, ASIC etc. In use the request receiving module 640 receives a request to add or remove a client device from a list of client devices for which access is to be filtered, updates the list 630 and notifies the module 650 which instructs the relevant network devices to update their forwarding policies and/or lists of client device for which access is to be filtered accordingly.

Figure 13:
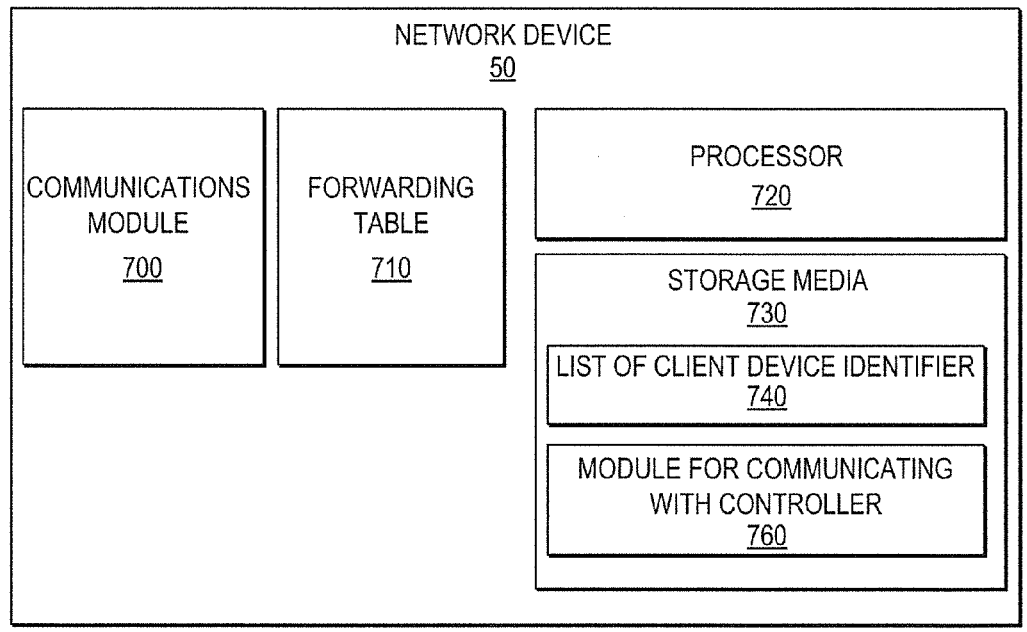
FIG. 13 shows an example structure of a network device for use in a system for filtering access to network content by a client device.

FIG. 13 shows an example structure of a network device. The network devices 50, 60 and 70 discussed in the disclosure above may have this structure. The network device comprises a communications module 700, a forwarding table 710, a processor 720 and non-transitory storage media 730 which are communicatively linked together by a bus or otherwise. The communications module 700 comprises one or more communications ports (e.g. Ethernet ports) and logic for transmitting and receiving messages through the one or more communications ports.

The forwarding table stores paths for packets or traffic flows based on characteristics of the packet or flow, e.g. based on the destination address, source address or other parameters. In this case, once instructed to do so by the controller 80, the forwarding table will forward packets or traffic flows associated with a client device for which content is to be filtered differently than packets or flows associated with other client devices. The routing table may be stored in RAM, or a dedicated storage media such as TCAM (ternary content addressable memory) etc. The processor 720 is operable to forward packets according to the forwarding policy or next hop specified by the forwarding table. The storage media may be provided by one or several storage devices and may for instance comprise SDRAM, Flash memory, a hard drive etc. The storage media stores a list 740 of client identifiers of client devices for which access to network content is to be filtered and a module 760 for communicating with the controller 80 and updating the forwarding table 710 in accordance with instructions received from the controller. While FIG. 13 shows the communications module a700 s a separate hardware module (e.g. an ASIC or other chip) and the module 760 for communication with the controller as software stored as machine readable instructions in the storage media 730 and executable by a processor; any of the modules may be hardware, software or a combination thereof.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A controller including a processor and a non-transitory storage medium storing machine readable instructions that are executable by the processor to:
    receive, from a user, a request to filter access by a particular client device to network content over a network; and
    in response to receiving the request to filter access by a particular client device, the controller is to update the forwarding table of a network switch to forward traffic associated with said particular client device along a second path which includes a content filtering device that is to prevent access to undesirable network content and allow access to content which is not determined to be undesirable by the content filtering device; and
    in response to receiving a request to un-filter access for a particular client device to update the forwarding table of the network switch to forward traffic associated with said particular client device along a first path which does not include said content filtering device.

2. The controller of claim 1, wherein in response to receiving said request to filter access by a particular client device, the controller is to send an update instruction to said network device to update a list of client identifiers of client devices whose access is to be filtered.

3. The controller of claim 1 wherein the forwarding instructions are further to detect a long-lived flow on the second path and after detection of said long-lived flow, direct the long-lived flow along the first path.

4. The controller of claim 1 wherein the controller is an open flow controller and wherein said forwarding instructions are in accordance with an open flow protocol.

5. The controller of claim 1 wherein in response to receiving a request to filter access to network content for a client device, the controller is to obtain a client identifier associated with said client device.

6. The controller of claim 1, wherein in response to receiving a request to stop filtering network access for a client device, the controller is to remove said client device from a list of client devices whose network access is to be filtered.

7. A system for filtering access by a client device to content over a network, said system comprising a network controller, a switch device and a content filtering device wherein:
    the network controller is to receive a request from a user to filter un-filter access by the client device to network content;
    in response to receiving said request the network controller is to update the forwarding table of the switch device, cause the switch device to forward packets associated with a client device, for which content is to be filtered, along a first path which includes the content filtering device, and forward packets associated with a client device, for which content is to be unfiltered, along a second path which does not include said content filtering device; and
    the content filtering device is to determine whether packets it receives relate to content that is to be blocked and to prevent access to content that is to be blocked and to allow access to content for which access is allowed.

8. The system of claim 7 wherein the system is part of a service provider network.

9. The system of claim 7 wherein said network controller and said switch device are separate physical devices.

10. The system of claim 7 wherein the content filtering device is to block access to content by at least one of blocking a request for access to such content from being transmitted and blocking download of such content.

11. The system of claim 7 wherein the switch device is a device through which the client device connects to network content.

12. The system of claim 11 wherein the client device is associated with a client identifier and the switch device is to determine if a traffic flow is associated with that client identifier.

13. The system of claim 7 wherein the system comprises a web portal through which a request to filter access by a specified client device may be sent by a user of a client device.

14. The controller of claim 1 wherein the forwarding instructions are to cause access to undesirable network content by the particular client device to be blocked only for certain client device applications.

15. The controller of claim 1 wherein:

in response to receiving a request to filter access by a first client device the controller is to send forwarding instructions to a network device to direct traffic associated with said first client device along a second path which includes said content filtering device; and in response to receiving a request to un-filter access by a second client device the controller is to send forwarding instructions to a network device to direct traffic associated with said second client device along a first path which does not include said content filtering device.

16. The controller of claim 1 wherein the undesirable content is pornography or other adult content.

17. The system of claim 7 wherein the content filtering device is to determine that the content requested by the client device is content that is to be blocked if the content is on a list of blocked URLs.

* * * * *